(12) United States Patent
Kim et al.

(10) Patent No.: US 12,700,827 B2
(45) Date of Patent: Aug. 4, 2026

(54) ELECTRICAL CONNECTOR AND INVERTER FOR SOLAR CELL MODULE INCLUDING SAME

(71) Applicant: HANWHA SOLUTIONS CORPORATION, Seoul (KR)

(72) Inventors: Joong Tae Kim, Seoul (KR); Ju Hwan Yun, Seoul (KR); Jung Guen Kim, Seoul (KR)

(73) Assignee: Hanwha Solutions Corporation, Seoul (KR)

( * ) Notice: Subject to any disclaimer, the term of this patent is extended or adjusted under 35 U.S.C. 154(b) by 0 days.

(21) Appl. No.: 19/107,358

(22) PCT Filed: Jan. 26, 2024

(86) PCT No.: PCT/KR2024/001294
§ 371 (c)(1),
(2) Date: Feb. 27, 2025

(87) PCT Pub. No.: WO2024/162707
PCT Pub. Date: Aug. 8, 2024

(65) Prior Publication Data
US 2026/0005646 A1 Jan. 1, 2026

(30) Foreign Application Priority Data
Jan. 30, 2023 (KR) ........................ 10-2023-0011701

(51) Int. Cl.
*H02S 40/34* (2014.01)
*H02S 40/20* (2014.01)
(Continued)

(52) U.S. Cl.
CPC .............. *H02S 40/34* (2014.12); *H02S 40/20* (2014.12); *H02S 40/32* (2014.12); *H02S 50/00* (2013.01)

(58) Field of Classification Search
CPC .......... H02G 3/08; H02G 3/081; H02S 40/34; H02S 40/20; H02S 40/32; H02S 50/00;
(Continued)

(56) References Cited

U.S. PATENT DOCUMENTS

| | | |
|---|---|---|
| 5,062,807 A | 11/1991 | Guss, III |
| 5,885,100 A | 3/1999 | Talend et al. |

(Continued)

FOREIGN PATENT DOCUMENTS

| | | |
|---|---|---|
| JP | 2013-533503 A | 8/2013 |
| KR | 10-2013-0021418 A | 3/2013 |

(Continued)

OTHER PUBLICATIONS

International Search Report for International Application No. PCT/KR2024/001294 dated Apr. 24, 2024.
(Continued)

*Primary Examiner* — Angel R Estrada
(74) *Attorney, Agent, or Firm* — Harness, Dickey & Pierce, P.L.C.

(57) ABSTRACT

An electrical connector according to an aspect includes: a first connector and a second connector arranged to electrically and physically couple an inverter and a power connector to each other or release same from each other; a bracket for coupling the first connector and the second connector together; and a lens unit coupled to the bracket, wherein the lens unit includes a lens exposed to the outside of a case, and an induction pipe connected to the lens and a light source.

12 Claims, 10 Drawing Sheets

(51) Int. Cl.
 *H02S 40/32*   (2014.01)
 *H02S 50/00*   (2014.01)

(58) Field of Classification Search
 CPC ....... H02S 50/10; H01R 13/629; H01L 31/04;
    H01L 31/048; G02B 6/122; G02B 6/26;
        G02B 6/38; G02B 6/42
 USPC .... 174/59, 50, 520, 541, 549; 361/600, 601,
    361/641, 627, 679.01; 220/3.2, 3.3;
             439/701
 See application file for complete search history.

(56)      References Cited

U.S. PATENT DOCUMENTS

| | | | | |
|---|---|---|---|---|
| 6,318,909 | B1 * | 11/2001 | Giboney | G02B 6/428 |
| | | | | 385/88 |
| 8,796,562 | B2 * | 8/2014 | Yang | H02S 40/34 |
| | | | | 174/64 |
| 8,962,998 | B2 * | 2/2015 | Solon | H01R 13/514 |
| | | | | 174/50 |
| 8,974,126 | B2 * | 3/2015 | Sloey | G02B 6/4204 |
| | | | | 385/93 |
| 10,490,916 | B1 | 11/2019 | Wu | |
| 10,795,086 | B2 * | 10/2020 | Matiss | G02B 6/421 |
| 11,777,444 | B2 * | 10/2023 | Pomerantz | H02G 3/16 |
| | | | | 174/50 |
| 11,848,631 | B2 * | 12/2023 | Yoon | H02P 23/28 |
| 11,927,817 | B2 * | 3/2024 | Yang | G02B 6/4292 |
| 2005/0037661 | A1 | 2/2005 | Tanacan et al. | |

| | | | |
|---|---|---|---|
| 2008/0289681 | A1 | 11/2008 | Adriani et al. |
| 2010/0093231 | A1 | 4/2010 | Lauermann et al. |
| 2019/0384007 | A1 | 12/2019 | Matiss et al. |

FOREIGN PATENT DOCUMENTS

| | | | |
|---|---|---|---|
| KR | 10-2014-0141147 | A | 12/2014 |
| KR | 101477685 | B1 | 12/2014 |
| KR | 10-2017-0117910 | A | 10/2017 |
| KR | 10-2018-0024169 | A | 3/2018 |
| KR | 10-2020-0011764 | A | 2/2020 |
| KR | 102091694 | B1 | 4/2020 |
| KR | 102356002 | B1 | 1/2022 |

OTHER PUBLICATIONS

Written Opinion of the International Searching Authority for International Application No. PCT/KR2024/001294 dated Apr. 24, 2024.
Korean Office Action for KR App. No. 10-2023-0011701 dated Jun. 18, 2024.
Korean Notice of Allowance for KR App. No. 10-2023-0011701 dated Dec. 29, 2024.
European Office Action dated Oct. 28, 2025 issued in corresponding European Patent Appln. No. 24750508.4.
Japanese Office Action dated Nov. 18, 2025 issued in corresponding Japanese Patent Appln. No. 2025-522787.
Chinese Office Action dated Jan. 14, 2026 issued in corresponding Chinese Patent Appln. No. 202480004735.3 (with English translation).
European Office Action dated Mar. 25, 2026 issued in corresponding European Patent Application No. 24750508.4.

* cited by examiner

ELECTRICAL CONNECTOR AND INVERTER FOR SOLAR CELL MODULE INCLUDING SAME

CROSS-REFERENCE TO RELATED APPLICATIONS

This application is a national phase under 35 U.S.C. § 371 of PCT International Application No. PCT/KR2024/001294 which has an International filing date of Jan. 26, 2024, which claims priority to Korean Application No. 10-2023-0011701, filed Jan. 30, 2023, the entire contents of each of which are hereby incorporated by reference.

TECHNICAL FIELD

The disclosure relates to an electrical connector and an inverter connected to a solar cell module including same.

BACKGROUND ART

A solar cell module may include a solar cell panel including solar cells, and a wiring box having parts, circuits, or the like connected to the solar cell panel.

After installing a solar cell module, it may only be possible to check an operation state of the solar cell module when using a separate communication device, such as the web or an application. Because it is difficult to recognize an operation state of a solar cell module from the solar cell module itself, there is a problem that the solar cell module is not properly managed.

To solve such a problem, a solar cell module has been proposed which is provided with structures, members, or the like capable of checking an operation state. For example, a structure has been proposed in which a light source capable of indicating an operation state is provided in a solar cell module and the operation state of the solar cell module is checked by whether the light source is driven (i.e. whether the light source blinks, intervals, or the like).

To this end, a structure has been proposed in which a lens is positioned on a side wall of the wiring box, a light source is inserted into an induction pipe, a side of the induction pipe is fixed to a part of a wiring material and another side thereof is fixed to the lens.

In this way, a light source, a lens, an induction pipe, and an induction pipe guide are required to check an operation state of a solar cell module. In addition, for a waterproof, an O-ring is required between the lens and a case. In this way, as the number of parts in the device for checking the operation state of the solar cell module increases, the cost also increases. In addition. as a manufacturing process of the device becomes more complex, there is a problem of lower productivity.

DISCLOSURE

Technical Problem

An electrical connector is provided which has a function of indicating operation of a solar cell module and is included in an inverter for a solar cell module.

In addition, an inverter for a solar cell module is provided which may increase productivity by simplifying an internal configuration.

The problems to be solved by the disclosure are not limited to the problems mentioned above, and other problems not mentioned herein will be clearly understood by those skilled in the art from the description below.

Technical Solution

An electrical connector according to an aspect comprises: a first connector and a second connector arranged to electrically and physically couple an inverter and a power connector to or release same from each other; a bracket for coupling the first connector and the second connector together; and a lens unit coupled to the bracket, wherein the lens unit includes a lens exposed to the outside of a case and an induction pipe connected to the lens and a light source.

In the electrical connector described above, the induction pipe includes a first part connected to the lens and penetrating the bracket, and a second part bent from the first part and aligned with the light source.

An inverter for a solar cell module according to another aspect comprises: a substrate on which a light source operating in conjunction with operation of a solar cell module is arranged; a case including the substrate inside; a bracket mounted to the case; a first connector and a second connector coupled to the bracket; and a lens unit coupled to the bracket, wherein the lens unit includes a lens exposed to the outside of the case and an induction pipe connected to the lens and the light source, and the first connector includes a first step surface, a second step surface spaced apart from the first step surface, a third step surface spaced apart from the second step surface, a first tooth connecting the first step surface and the second step surface, and a first outer circumferential surface connecting the second step surface and the third step surface, and the second connector includes a fourth step surface, a fifth step surface spaced apart from the fourth step surface, a sixth step surface spaced apart from the fifth step surface, a second tooth connecting the fourth step surface and the fifth step surface, and a second outer circumferential surface connecting the fifth step surface and the sixth step surface, and the bracket includes a first contact surface contacting the first step surface, a third tooth engaging with the first tooth, a second contact surface contacting the second step surface, a third contact surface contacting the third step surface, a fourth contact surface contacting the fourth step surface, a fourth tooth engaging with the second tooth, a fifth contact surface contacting the fifth step surface, and a sixth contact surface contacting the sixth step surface, and the lens contacts an outer circumferential surface of the bracket.

In the inverter for a solar cell module described above, the bracket includes a seventh contact surface contacting first outer circumferential surface and an eighth contact surface contacting a second outer circumferential surface.

In the inverter for a solar cell module described above, the first connector includes a third outer circumferential surface connected to the third step surface, and the bracket includes a ninth contact surface contacting the third outer circumferential surface.

In the inverter for a solar cell module described above, an outer diameter of the third outer circumferential surface is smaller than an outer diameter of the first outer circumferential surface.

In the inverter for a solar cell module described above, the second connector includes a fourth outer circumferential surface connected to the sixth step surface, and the bracket includes a tenth contact surface contacting the fourth outer circumferential surface.

In the inverter for a solar cell module described above, an outer diameter of the fourth outer circumferential surface is smaller than an outer diameter of the second outer circumferential surface.

In the inverter for a solar cell module described above, a radial thickness of the third step surface is smaller than a radial thickness of the first step surface, and a radial thickness of the sixth step surface is smaller than a radial thickness of the fourth step surface.

In the inverter for a solar cell module described above, the lens protrudes more than the bracket and is exposed to the outside.

In the inverter for a solar cell module described above, the case includes an upper case and a lower case coupled with the upper case, and the upper case includes a rib protruding from an inner side, and an upper surface of the bracket contacts the rib, and a lower surface of the bracket contacts a lower surface of the lower case.

In the inverter for a solar cell module described above, the induction pipe includes a first part connected to the lens and penetrating the bracket and a second part bent from the first part and aligned with the light source.

Advantageous Effects

According to an embodiment, a lens unit and a bracket including a connector and an induction pipe may be manufactured by integral injection molding, thereby simplifying a configuration and increasing productivity.

According to an embodiment, a lens unit and a bracket including a connector and an induction pipe may be manufactured by integral injection molding, thereby facilitating assembly.

According to an embodiment, a lens unit and a bracket including a connector and an induction pipe may be manufactured by integral injection molding, thereby improving waterproof performance.

BEST MODE

Figure 1:
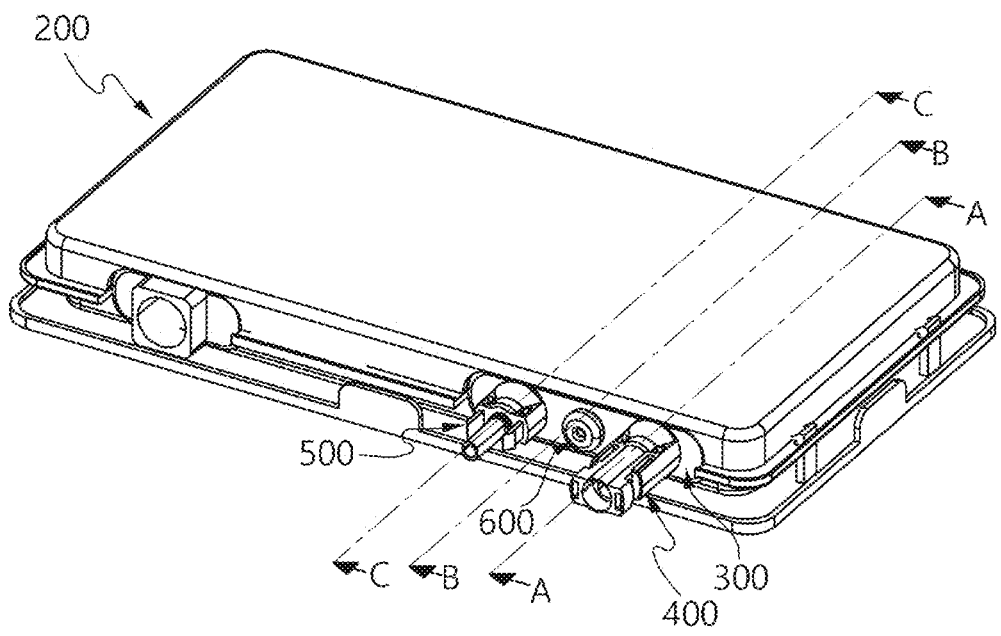
FIG. 1 is a diagram illustrating an inverter for a solar cell module according to an embodiment.

An electrical connector according to an aspect includes: a first connector and a second connector arranged to electrically and physically couple an inverter and a power connector to each other or release same from each other; a bracket for coupling the first connector and the second connector together; and a lens unit coupled to the bracket, wherein the lens unit includes a lens exposed to the outside of a case and an induction pipe connected to the lens and a light source.

MODE FOR INVENTION

Hereinafter, preferred embodiments of the disclosure will be described in detail with reference to the attached drawings.

However, the technical idea of the disclosure is not limited to some of the embodiments described, but may be implemented in various different forms, and in the scope of the technical idea of the disclosure, one or more of the components among the embodiments may be selectively combined or substituted for use.

In addition, terms (including technical and scientific terms) used in the embodiments of the disclosure may be interpreted as having a meaning which may be generally understood by a person of ordinary skill in the technical field to which the disclosure belongs, unless explicitly and specifically defined and described, and terms that are commonly used, such as terms defined in a dictionary, may be interpreted in consideration of the contextual meaning of the related art.

In addition, the terms used in the embodiments of the disclosure may be for the purpose of describing the embodiments and are not intended to limit the disclosure.

In this specification, the singular may also include the plural unless specifically stated otherwise in a phrase, and in case that it is described as 'at least one (or one or more) of A, B, or C', it may include one or more of all combinations which may be combined with A, B, and C.

In addition, in describing components of the embodiments of the disclosure, terms, such as first, second, A, B, (a), (b), or the like may be used.

Such a term is only intended to distinguish a component from another, and is not intended to limit the nature, order, sequence, or the like of the component.

In addition, in case that a component is described as being 'connected', 'coupled' or 'linked' to another component, it may include not only cases where the component is directly connected, coupled or linked to the other component, but also cases where the component is 'connected', 'coupled' or 'linked' by another component between the component and another component.

In addition, in case that it is described as being included or arranged 'upper (above) or lower (below)' each component, 'upper (above) or lower (below)' may include not only cases where two components are in direct contact with each other, but also cases where one or more other components are included or arranged between the two components. In addition, in case that it is expressed as 'upper (above) or lower (below)', it may include the meaning of not only an upward direction but also a downward direction based on one component.

Figure 2:
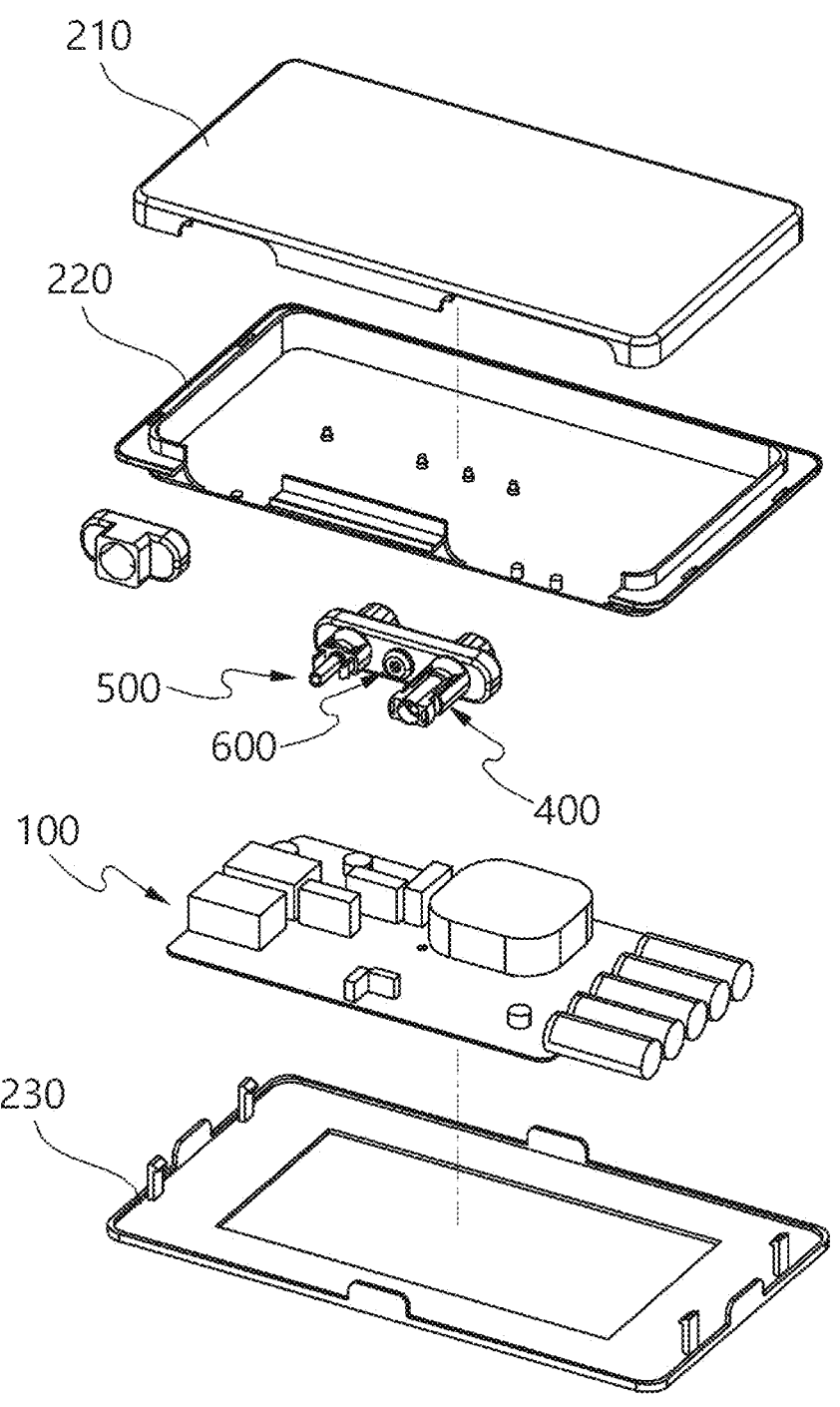
FIG. 2 is an exploded view of the inverter shown in FIG. 1.

FIG. 1 is a drawing illustrating an inverter for a solar cell module according to an embodiment, and FIG. 2 is an exploded view of the inverter illustrated in FIG. 1.

Referring to FIGS. 1 and 2, an inverter for a solar cell module (hereinafter referred to as an 'inverter') may include a substrate 100, a case 200, a bracket 300, a first connector

400, a second connector 500, and a lens unit 600. For example, an inverter may be connected to a solar cell module.

An inverter may convert current, voltage, or power generated by a solar cell module. In this regard, the conversion may be changing a value and/or type of current, voltage or power. For example, an inverter may change a value of current, voltage, or power to another value. In addition, an inverter may change current, voltage, or power from direct current to alternating current or from alternating current to direct current. The current, voltage, or power converted by the inverter may be transmitted externally through a cable.

A light source operating in conjunction with operation of a solar cell module may be arranged on a substrate 100. For example, light irradiated from a light source may be a signal indicating an operating state of a solar cell module. That is, the operation state of a solar cell module may be output by various expression methods using light.

As an example, a normal operation of a solar cell module may be expressed by turning the light on/off. For example, in case that a solar cell module is operating normally, a light source may remain off, and in case that there is a problem with the solar cell module, the light source may be turned on. In addition, in case that a solar cell module is operating normally, a light source 110 may remain on, and in case that there is a problem with the solar cell module, the light source 110 may be turned off.

As another example, various behavioral problems of a solar cell module may be expressed depending on time of irradiating light, a color of the light, and an intensity of the light. For example, light may be irradiated at different time intervals, different colors, and/or different intensities depending on which element among elements included in a solar cell module is experiencing a problem.

Any device which may be irradiated with light may be considered as a light source without limitation. For example, a light source may be implemented as a liquid crystal display (LCD), a light emitting diode (LED), an organic light emitting diode (OLED), a quantum dot light emitting diode (QLED), a μLED, or the like.

A substrate 100 may be accommodated inside a case 200. For example, the case 200 may include an upper case 210, a lower case 220, and a support case 230. The substrate 100 may be arranged between the upper case 210 and the lower case 220. The support case 230 may be arranged below the lower case 220.

A bracket 300 may be coupled to the case 200 to support a first connector 400, a second connector 500, and a 600.

The first connector 400 and the second connector 500 are arranged to electrically and physically couple an inverter and a power connector to each other or release same from each other. For example, the first connector 400 and the second connector 500 may be coupled to the bracket 300 and may each be either a female connector or a male connector.

The lens unit 600 may emit light irradiated from a light source to the outside of the case 200 so that the light may be identified by a user. For example, the lens unit 600 may be coupled to the bracket 300.

Hereinafter, with reference to FIGS. 3 to 10, an electrical connector 700 including a bracket 300, a first connector 400, a second connector 500, and a lens unit 600 will be described.

Figure 3:
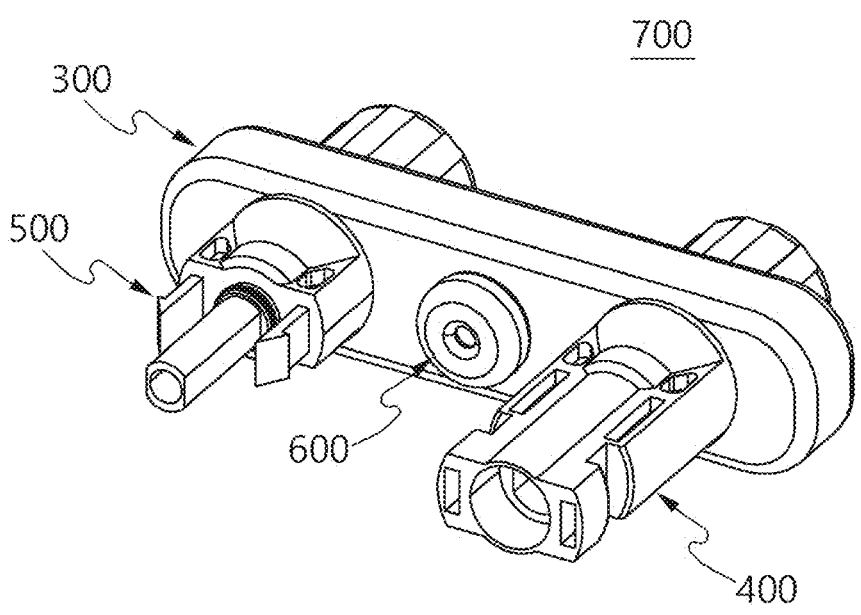
FIG. 3 is a front perspective view of a bracket, a first connector, a second connector, and a lens unit according to an embodiment.
Figure 4:
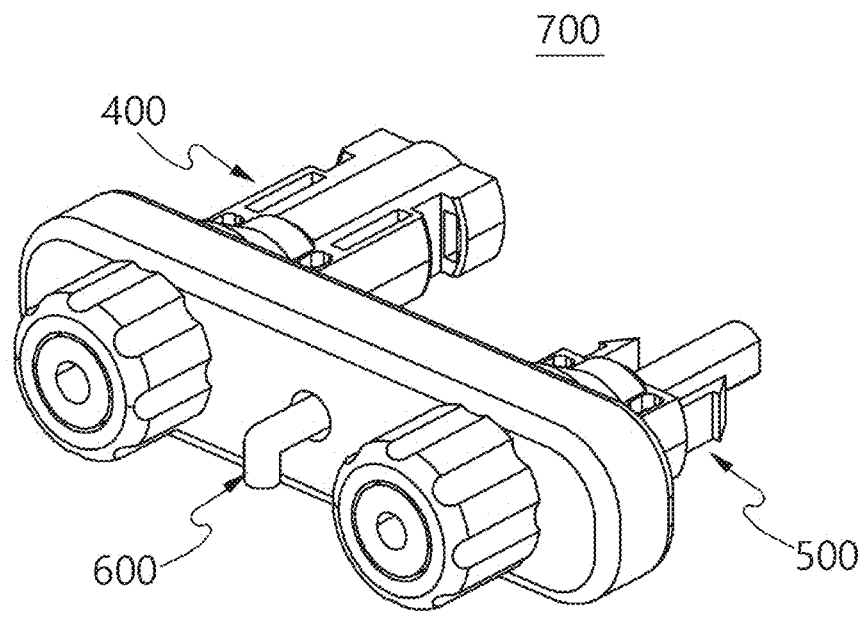
FIG. 4 is a rear perspective view of a bracket, a first connector, a second connector, and a lens unit according to an embodiment.

FIG. 3 is a front perspective view of a bracket, a first connector, a second connector, and a lens unit according to an embodiment, and FIG. 4 is a rear perspective view of a bracket, a first connector, a second connector, and a lens unit according to an embodiment.

Referring to FIGS. 3 and 4, a bracket 300, a first connector 400, a second connector 500, and a lens unit 600 may be integrally molded and implemented as one part.

First, the first connector 400 and the second connector 500 are injection-molded while being aligned side by side, so that the first connector 400, the second connector 500, and the bracket 300 may be molded into one body. Thereafter, the lens unit 600 is included between the first connector 400 and the second connector 500 by injection molding, so that the bracket 300, the first connector 400, the second connector 500, and the lens unit 600 may be molded into one body.

The bracket 300 may be manufactured from a material which does not deform after molding. For example, the bracket 300 may be manufactured from a plastic resin of the bracket 300, but is not limited thereto.

At least one of the first connector 400 or the second connector 500 may be included to protrude more than the bracket 300 in an anteroposterior direction of the bracket 300. The lens unit 600 may also protrude more than the bracket 300 to be exposed to the outside.

In this way, by implementing four parts into one body, a structure of the electrical connector 700 may be simplified. Accordingly, productivity of the electrical connector 700 may be increased, and waterproof performance of the electrical connector 700 may also be improved.

Figure 5:
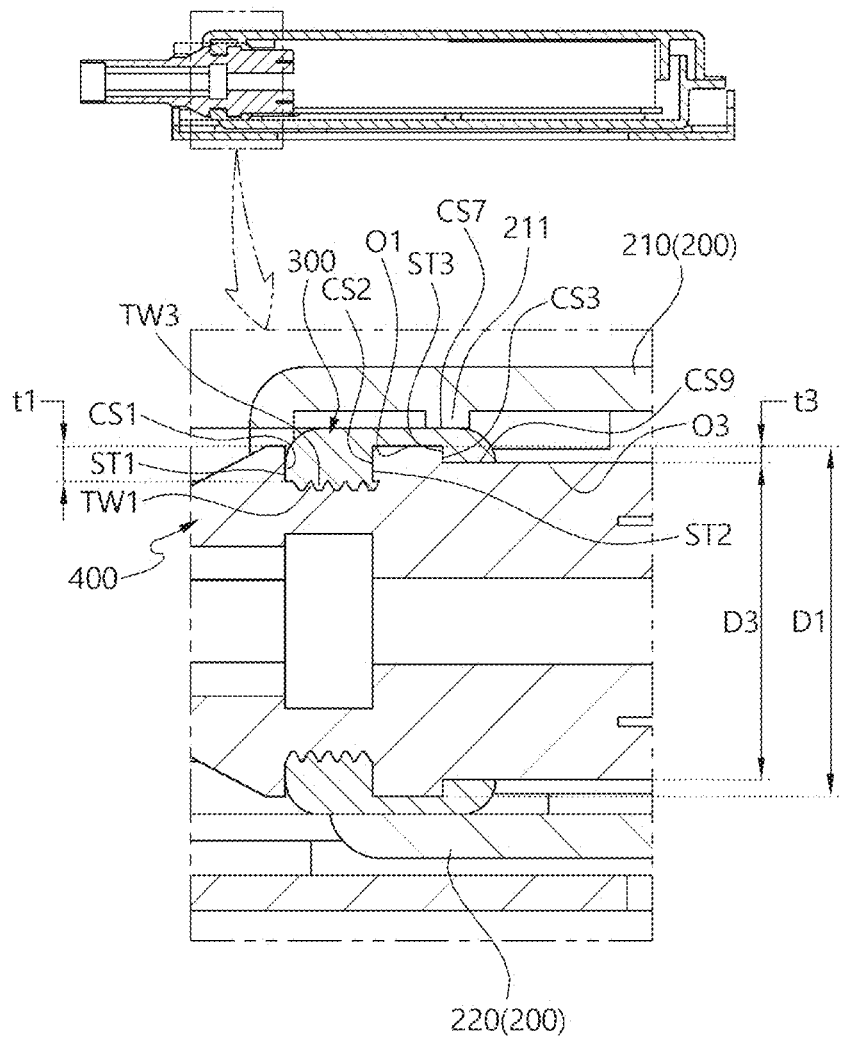
FIG. 5 is a sectional side view taken along a virtual line A-A FIG. 1.

FIG. 5 is a sectional side view taken along a virtual line A-A of FIG. 1.

Referring to FIG. 5, a first connector 400 may include a first step surface ST1, a second step surface ST2, and a third step surface ST3. In addition, the first connector 400 may include a first tooth TW1, a first outer circumferential surface O1, and a third outer circumferential surface O3.

For example, the first step surface ST1, the second step surface ST2, and the third step surface ST3 may each be annular. In addition, the second step surface ST2 may be spaced apart from the first step surface ST1, and the third step surface ST3 may be spaced apart from the second step surface ST2.

For example, the first tooth TW1 may connect the first step surface ST1 and the second step surface ST2. In addition, the first outer circumferential surface O1 is cylindrical and may connect the second step surface ST2 and the third step surface ST3. In addition, the third outer circumferential surface O3 is cylindrical and may be connected to the third step surface ST3.

The bracket 300 may include a first contact surface CS1, a second contact surface CS2, a third contact surface CS3, a seventh contact surface CS7, and a ninth contact surface CS9.

For example, the first contact surface CS1 may contact the first step surface ST1, and the first contact surface CS1 may be annular. In addition, the second contact surface CS2 may contact the second step surface ST2, and the second contact surface CS2 may be annular. In addition, the third contact surface CS3 may contact the third step surface ST3, and the third contact surface CS3 may be annular. In addition, the seventh contact surface CS7 may contact the first outer circumferential surface O1, and the ninth contact surface CS9 may contact the third outer circumferential surface O3. The seventh contact surface CS7 and the ninth contact surface CS9 may each be cylindrical.

In addition, the bracket 300 may include a third tooth TW3, and the third tooth TW3 may connect the first contact surface CS1 and the second contact surface CS2.

For example, the first tooth TW1 and the third tooth TW3 may engage with each other in a direction increasing an area in which the bracket 300 and the first connector 400 are in contact with each other. Accordingly, coupling strength between the bracket 300 and the first connector 400 may be increased. In FIG. 5, the first tooth TW1 and the third tooth TW3 are each illustrated as being included in a sawtooth shape, but are not limited thereto. The first tooth TW1 and the third tooth TW3 may be manufactured in various shapes, such as a wave shape, a rough shape, or the like to increase a surface area in contact with each other.

In FIG. 5, an outer diameter D3 of the third outer circumferential surface O3 is shown to be smaller than an outer diameter D1 of the first outer circumferential surface O1, and a radial thickness t3 of the third step surface ST3 is shown to be smaller than a radial thickness t1 of the first step surface ST1, but this is not limited thereto.

Figure 6:
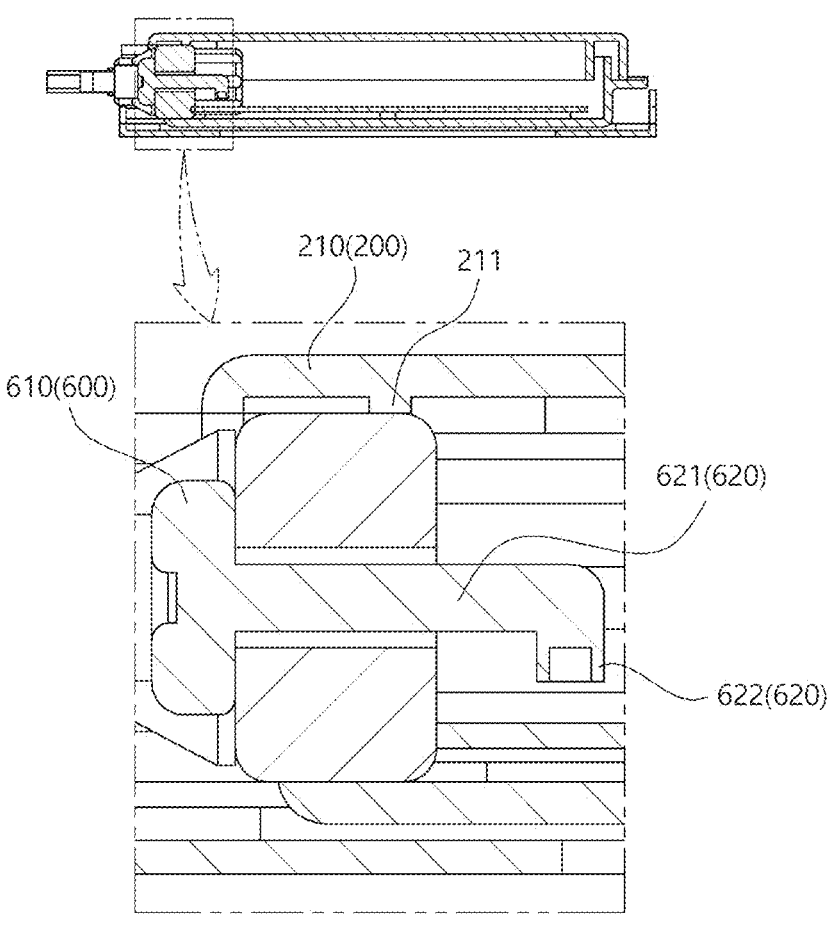
FIG. 6 is a sectional side view taken along a virtual line B-B of FIG. 1.

FIG. 6 is a sectional side view taken along a virtual line B-B of FIG. 1.

Referring to FIG. 6, a lens unit 600 may be manufactured from a transparent resin material. In addition, the lens unit 600 may include a lens 610 and an induction pipe 620 extending from the lens 610.

For example, the lens 610 may be positioned in front of the bracket 300 and may come into contact with an outer surface of the bracket 300. The induction pipe 620 may be positioned penetrating the bracket 300. For example, the induction pipe 620 may include a first part 621 penetrating the bracket 300 and a second part 622 bent from the first part 621 and aligned with a light source. In this regard, the first part 621 may be arranged spaced apart from the bracket 300.

Figure 7:
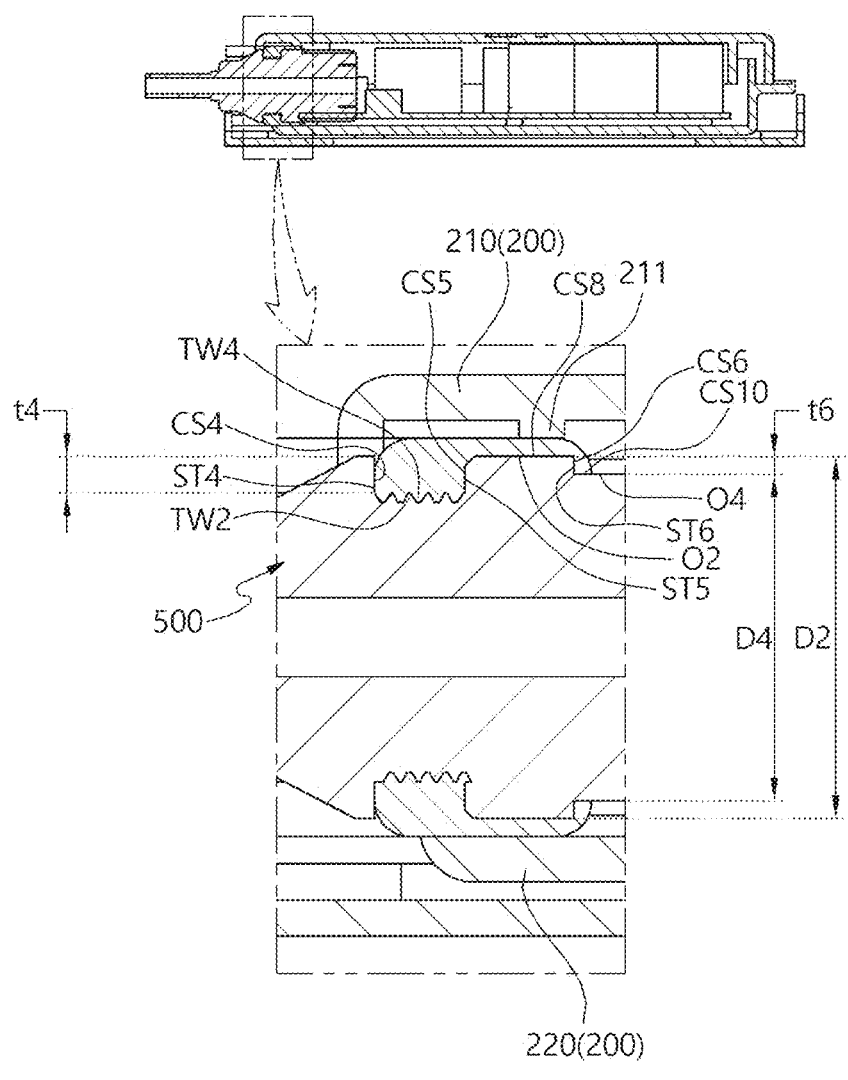
FIG. 7 is a sectional side view taken along a virtual line C-C of FIG. 1.

FIG. 7 is a sectional side view taken along a virtual line C-C of FIG. 1.

Referring to FIG. 7, the second connector 500 may include a fourth step surface ST4, a fifth step surface ST5, and a sixth step surface ST6. In addition, the second connector 500 may include a second tooth TW2, a second outer circumferential surface O2, and a fourth outer circumferential surface O4.

For example, the fourth step surface ST4, the fifth step surface ST5, and the sixth step surface ST6 may each be annular. In addition, the fifth step surface ST5 may be spaced apart from the fourth step surface ST4, and the sixth step surface ST6 may be spaced apart from the fifth step surface ST5.

For example, the second tooth TW2 may connect the fourth step surface ST4 and the fifth step surface ST5. In addition, the second outer circumferential surface O2 is cylindrical and may connect the fifth step surface ST5 and the sixth step surface ST6. In addition, the fourth outer circumferential surface O4 is cylindrical and may be connected to the sixth step surface ST6.

The bracket 300 may include a fourth contact surface CS4, a fifth contact surface CS5, a sixth contact surface CS6, an eighth contact surface CS8, and a tenth contact surface CS10.

For example, the fourth contact surface CS4 may contact the fourth step surface ST4, and the fourth contact surface CS4 may be annular. In addition, the fifth contact surface CS5 may contact the fifth step surface ST5, and the fifth contact surface CS5 may be annular. In addition, the sixth contact surface CS6 may contact the sixth step surface ST6, and the sixth contact surface CS6 may be annular. In addition, the eighth contact surface CS8 may contact the second outer circumferential surface O2. In addition, the tenth contact surface CS10 may contact the fourth outer circumferential surface O4, and the eighth contact surface CS8 and the tenth contact surface CS10 may each be cylindrical.

In addition, the bracket 300 may include a fourth tooth TW4, and the fourth tooth TW4 may connect the fourth contact surface CS4 and the fifth contact surface CS5.

For example, the second tooth TW2 and the fourth tooth TW4 may engage with each other in a direction increasing an area in which the bracket 300 and the second connector 500 are in contact with each other. Accordingly, coupling strength between the bracket 300 and the second connector 500 may be increased. In FIG. 7, the second tooth TW2 and the fourth tooth TW4 are each illustrated as being included in a sawtooth shape, but are not limited thereto. The second tooth TW2 and the fourth tooth TW4 may be manufactured in various shapes, such as a wave shape, a rough shape, or the like to increase a surface area in contact with each other.

In FIG. 7, an outer diameter D4 of the fourth outer circumferential surface O4 is shown to be smaller than an outer diameter D2 of the second outer circumferential surface O2, and a radial thickness t6 of the sixth step surface ST6 is shown to be smaller than a radial thickness t4 of the fourth step surface ST4, but this is not limited thereto.

Figure 8:
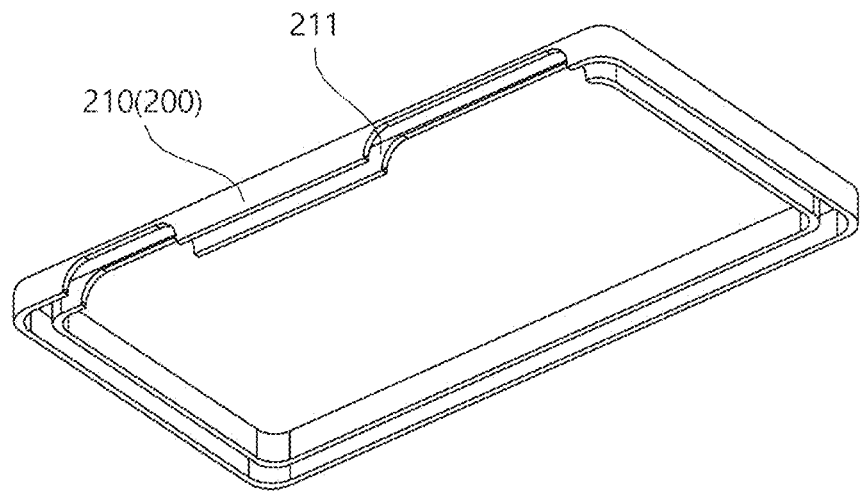
FIG. 8 is a drawing illustrating an upper case according to an embodiment.

FIG. 8 is a drawing illustrating an upper case according to an embodiment.

Referring to FIG. 8, an upper case 210 may include a rib 211 protruding from an inner side, and an upper surface of the bracket 300 may come into contact with the rib 211.

Figure 9:
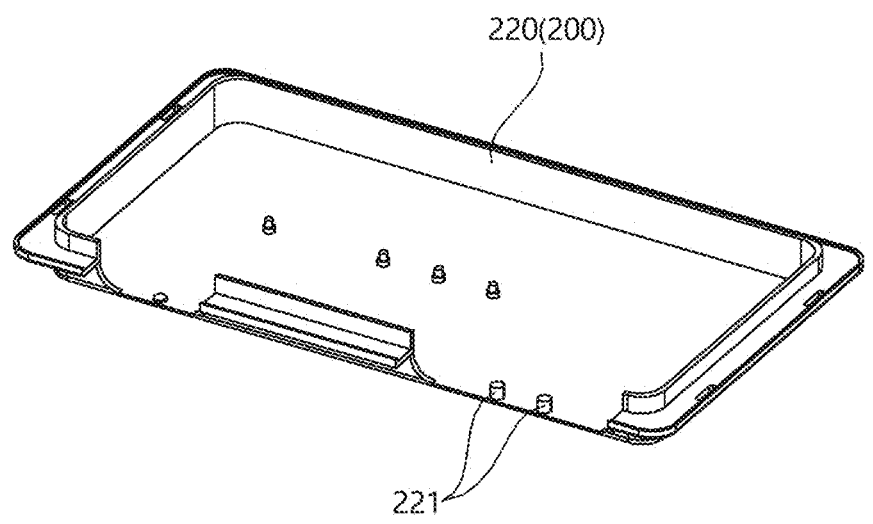
FIG. 9 is a diagram illustrating a lower case according to an embodiment.
Figure 10:
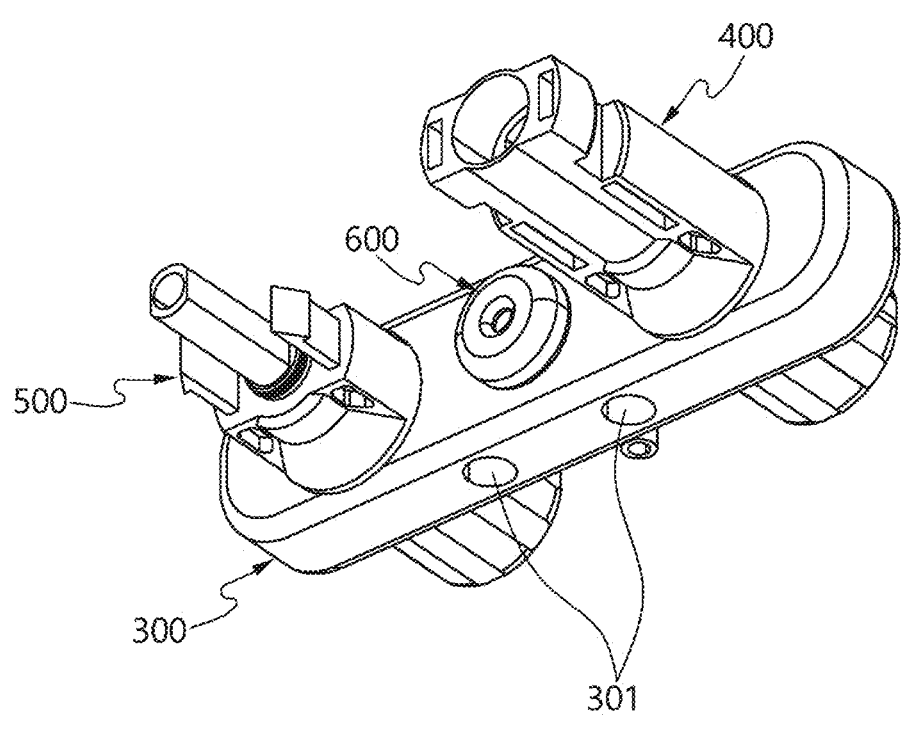
FIG. 10 is a drawing illustrating a bracket, a first connector, a second connector, and a lens unit as viewed from below according to an embodiment.

FIG. 9 is a drawing illustrating a lower case according to an embodiment, and FIG. 10 is a drawing illustrating a bracket, a first connector, a second connector, and a lens unit as viewed from below according to an embodiment.

Referring to FIGS. 9 and 10. a lower surface of the bracket 300 may come into contact with a lower surface of a lower case 220. At this time, the lower case 220 may include at least one protrusion 221 protruding from an inner side. In addition, the bracket 300 may include at least one groove 301 arranged on the lower surface. For example, the bracket 300 may come into contact with the lower case 220 when a protrusion 221 is inserted into a groove 301. Due to the presence of a groove 301 and a protrusion 221, coupling strength between the bracket 300 and the case 200 may be improved.

However, an arrangement of a protrusion 221 and an arrangement of a groove 301 are not limited to those shown in FIGS. 9 and 10. In other words, there is no limitation on the number and arrangement of a protrusion 221 and a groove 301 when a protrusion 221 may be inserted into a groove 301.

It should be understood that the above-described embodiments of the disclosure are illustrative in all respects and not restrictive, and the scope of the disclosure is indicated by the claims described below than by the detailed description described above. In addition, the meaning and scope of the claims, as well as all changes or modifications derived from the equivalent concept, should be interpreted as being included in the scope of the disclosure.

The invention claimed is:

1. An electrical connector included in an inverter, the electrical connector comprising:
   a first connector and a second connector that enable electrical and physical connection and disconnection between the inverter and a connector physic of a power source;
   a bracket that couples the first connector and the second connector to each other; and
   a lens unit coupled to the bracket,
   wherein the lens unit comprises a lens exposed to outside of a case, and an induction pipe connected to the lens and a light source, the first connector and the second connector are formed to protrude more than the bracket in forward and backward directions of the bracket, and the first connector, the second connector, the bracket, and the lens unit are coupled together to form an integral structure.

2. The electrical connector of claim 1, wherein the induction pipe comprises a first part connected to the lens and penetrating the bracket, and a second part bent from the first part and aligned with the light source.

3. An inverter for a solar cell module, the inverter comprising:

a substrate on which a light source is arranged, the light source operating in conjunction with an operation of the solar cell module;

a case accommodating the substrate therein;

a bracket mounted on the case;

a first connector and a second connector both coupled to the bracket; and a lens unit coupled to the bracket, wherein the lens unit comprises a lens exposed to outside of the case, and an induction pipe connected to the lens and the light source, the first connector comprises a first annular step surface, a second annular step surface spaced apart from the first annular step surface, a third annular step surface spaced apart from the second annular step surface, a first tooth connecting the first annular step surface and the second annular step surface, and a first cylindrical outer circumferential surface connecting the second annular step surface and the third annular step surface, the second connector comprises a fourth annular step surface, a fifth annular step surface spaced apart from the fourth annular step surface, a sixth annular step surface spaced apart from the fifth annular step surface, a second tooth connecting the fourth annular step surface and the fifth annular step surface, and a second cylindrical outer circumferential surface connecting the fifth annular step surface and the sixth annular step surface, the bracket comprises a first contact surface in contact with the first annular step surface, a third tooth engaging with the first tooth, a second contact surface in contact with the second annular step surface, a third contact surface in contact with the third annular step surface, a fourth contact surface in contact with the fourth annular step surface, a fourth tooth engaging with the second tooth, a fifth contact surface in contact with the fifth annular step surface, and a sixth contact surface in contact with the sixth annular step surface, and the lens is in contact with an outer surface of the bracket.

4. The inverter of claim 3, wherein the bracket comprises a seventh contact surface in contact with the first outer circumferential surface, and an eighth contact surface in contact with the second outer circumferential surface.

5. The inverter of claim 4, wherein the first connector comprises a third outer circumferential surface connected to the third step surface, and the bracket comprises a ninth contact surface in contact with the third outer circumferential surface.

6. The inverter of claim 5, wherein an outer diameter of the third outer circumferential surface is less than an outer diameter of the first outer circumferential surface.

7. The inverter of claim 6, wherein the second connector comprises a fourth outer circumferential surface connected to the sixth step surface, and the bracket comprises a tenth contact surface in contact with the fourth outer circumferential surface.

8. The inverter of claim 7, wherein an outer diameter of the fourth outer circumferential surface is less than an outer diameter of the second outer circumferential surface.

9. The inverter of claim 8, wherein a radial thickness of the third step surface is less than a radial thickness of the first step surface, and a radial thickness of the sixth step surface is less than a radial thickness of the fourth step surface.

10. The inverter of claim 9, wherein the lens protrudes more than the bracket and is exposed to outside.

11. The inverter of claim 10, wherein the case comprises an upper case and a lower case coupled to the upper case, the upper case comprises a rib protruding from an inner surface, an upper surface of the bracket is in contact with the rib, and a lower surface of the bracket is in contact with a lower surface of the lower case.

12. The inverter of claim 11, wherein the induction pipe comprises a first part connected to the lens and penetrating the bracket, and a second part bent from the first part and aligned with the light source.

* * * * *